United States Patent [19]

Hinselmann et al.

[11] 4,436,870

[45] Mar. 13, 1984

[54] PRODUCTION OF MOLDING MATERIALS CONTAINING POLYPHENYLENE ETHERS

[75] Inventors: Klaus Hinselmann, Mutterstadt; Herbert Naarmann, Wattenheim; Adolf Echte, Ludwigshafen; Eduard Heil, Limburgerhof; Albert Nikles, Ludwigshafen; Rudi W. Reffert, Beindersheim; Juergen Hambrecht, Heidelberg, all of Fed. Rep. of Germany

[73] Assignee: BASF Aktiengesellschaft, Fed. Rep. of Germany

[21] Appl. No.: 400,689

[22] Filed: Jul. 22, 1982

[30] Foreign Application Priority Data

Aug. 7, 1981 [DE] Fed. Rep. of Germany ....... 3131440

[51] Int. Cl.$^3$ .............................................. C08L 71/04
[52] U.S. Cl. ........................................ 525/53; 525/54; 525/68; 525/132; 525/905
[58] Field of Search .................. 525/68, 132, 905, 53, 525/54

[56] References Cited

U.S. PATENT DOCUMENTS 3,969,320 7/1976 Modan ................................. 526/346
4,283,503 8/1981 Wright ................................ 525/905

Primary Examiner—J. Ziegler
Attorney, Agent, or Firm—Keil & Witherspoon

[57] ABSTRACT

Molding materials containing high molecular weight polyphenylene ethers are produced by a process in which a solution of a polyphenylene ether in an organic solvent, together with another polymer, is freed of solvent by multi-stage evaporation.

The solvent is preferably an aromatic compound from the class comprising the hydrocarbons, halohydrocarbons, ethers or esters, the ratio of the other polymer to the polyphenylene ether is advantageously from 99:1 to 20:80 parts by weight, the other polymer is, in particular, a homopolymer or copolymer of styrene or of a homolog thereof, which may be modified with rubber, and the multi-stage evaporation process preferably comprises not less than two and not more than four working up stages.

The evaporation is carried out in general at from 120° to 280° C. and under a pressure of from 1 to 3,000 mbar, advantageously in the presence of assistants which reduce the partial pressure, eg. water and/or methanol.

4 Claims, No Drawings

PRODUCTION OF MOLDING MATERIALS CONTAINING POLYPHENYLENE ETHERS

The present invention relates to a process for the production of molding materials containing high molecular weight polyphenylene ethers.

These molding materials are unshaped or preshaped materials which, owing to their content of polyphenylene ethers, are very suitable for use at high peak temperatures and at a high sustained temperature.

It has been disclosed that a high molecular weight polyphenylene ether may be prepared from a monohydric phenol and thereafter precipitated from the reaction solution in an aromatic solvent by means of methanol, and the precipitated polymer filtered off (cf. U.S. Pat. No. 3,661,848). The dry polymer is then usually admixed to a styrene polymer in an extruder.

A disadvantage of the conventional process is that large amounts of solvent and precipitating agent are used. Moreover, the high mixing temperature of 250°-350° C. in the extruder may result in mechanical and thermal damage to the product, particularly to the admixed styrene polymer or to the rubber component in the styrene polymer. Another disadvantage of the conventional mixing processes is the high energy consumption during the compounding and the recovery of the solvent.

It is an object of the present invention to avoid the above disadvantages and to provide a simple and cheap process for the preparation of polyphenylene ether blends, wherein the degradation of the polymer components in the product is substantially reduced.

We have found that this object is achieved, according to the invention, when a solution of a polyphenylene ether in an organic solvent, together with another polymer, is freed of the solvent by multi-stage evaporation.

The solvent is preferably an aromatic compound from the class comprising the hydrocarbons, halohydrocarbons, ethers or esters. Advantageously, the ratio of the other polymer to the polyphenylene ether is from 99:1 to 20:80 parts by weight, based on the mixture, and the other polymer is a homopolymer or copolymer of styrene, or of a homolog thereof, which may be modified with rubber.

Preferably, the multi-stage evaporation process comprises not less than two and not more than four working-up stages. In a particularly preferred process, the solvent is evaporated at from 120° to 280° C. and under a pressure of from 1 to 3,000 mbar. It is also advantageous to carry out the evaporation in the presence of assistants which reduce the partial pressure, eg. water and/or methanol.

The polyphenylene ether is a self-condensation product of a monohydric monocyclic phenol, and is prepared by reacting the phenol with oxygen in the presence of a catalyst complex. It has a molecular weight of from 23,000 to 40,000, preferably from 25,000 to 30,000, determined according to the method described in Macromolecular Synthesis 1 (1978), 83. The novel polyphenylene ethers contain repeating structural units of the general formula I:

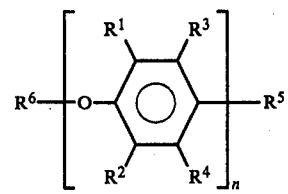

The oxygen atom of one unit is bonded to the benzene ring of the adjacent unit, and n is a positive integer of not less than 50, preferably not less than 100. $R^1$, $R^2$, $R^3$ and $R^4$ are identical or different substituents from the group comprising hydrogen, halogen, hydrocarbon radicals, halohydrocarbon radicals, hydrocarbon-oxy radicals, etc., and $R^5$ is hydrogen. $R^6$ may be hydrogen, a hydrocarbon radical or a carboxyl group, and may also be polyfunctional, so that two or more polyphenylene ether molecules are linked together via $R^6$. Such polyfunctional groups are derived from polycarboxylic acids or carboxylic acid anhydrides, eg. maleic anhydride, pryomellitic anhydride, azelaic acid, pyromellitic acid, polyacrylic acid, etc.

High molecular weight polyphenylene ethers having the structure I, also referred to as poly(phenylene oxides), have been known from the literature for a considerable time (cf. for example, U.S. Pat. Nos. 3,561,848, 3,219,625 and 3,378,505), so that a further description is not necessary here.

The monohydric phenols which are used for the preparation of the novel high molecular weight polyphenylene ethers of the formula I, and which have alkyl substituents in both ortho-positions and may have an alkyl substituent in the meta-position, but not in the para-position, are conventional phenols, eg. 2,6-dimethylphenol, 2,6-diethylphenol, 2-methyl-6-ethylphenol, 2-methyl-6-propylphenol, 2,6-dibutylphenol and 2,3,6-trimethylphenol, as well as mixtures of these.

Polycondensation is usually carried out by passing oxygen into a solution of the monomer, at 25°-50° C., in the presence of a catalyst complex. The oxygen flow rate is substantially the same as described in U.S. Pat. Nos. 3,306,874 and 3,306,875. In the conventional processes, the catalyst comprising a copper salt, preferably copper(I) bromide, an amine and from 0.01 to 5% by weight of 2,6-dimethylphenol is metered into the vessel containing the dissolved monomers.

The catalyst complex conventionally used for the polycondensation is a combination of an amine, for example di-n-butylamine, diethylamine, picoline, quinoline, a pyridine base, triisopropylamine, dimethylisopropanolamine, triethanolamine, triisopropanolamine or diisopropanolamine, with a copper salt, eg. copper(I) bromide, copper(I) chloride, copper(I) iodide, copper(II) acetate, copper(II) propionate, copper(II) ethyl acetoacetate or copper(II) acetylacetonate. The amount of amine employed is preferably from 2.0 to 25.0 moles per 100 moles of the monomer, but the concentration of the amine in the reaction mixture can vary within wide limits, though low concentrations are advantageous. The concentration of the copper salt is kept low, and preferably varies from 0.2 to 2.5 moles per 100 moles of the monomer.

The ratio of solvent to monomer is usually from 1:1 to 20:1, ie. the maximum represents a 20-fold excess of solvent over monomer.

The solvent employed may be benzene, toluene, ethylbenzene, cumene, xylene, methylethylbenzene, another alkylated aromatic hydrocarbon of not more than 12 carbon atoms, an aliphatic hydrocarbon, preferably a $C_6$–$C_{10}$ hydrocarbon, an aromatic halohydrocarbon, eg. chlorobenzene, dichlorobenzene, etc., an aryl alkyl ether, eg. anisole, p-methylanisole, ethyl phenyl ether, etc., or an aromatic carboxylic acid ester, eg. methyl benzoate, etc. Toluene, ethylbenzene or anisole is preferably used.

The polyphenylene ether solution employed in the novel process contains only small residual amounts of the catalyst complex employed in the oxidative self-condensation of the starting phenol. Residual catalyst is removed by one of the processes described in the literature (U.S. Pat. Nos. 3,984,374, 3,988,298, 4,026,870, 4,024,107 and 4,150,218), the content of the catalyst metal atom, in general of copper, being reduced to below 10 ppm, preferably >8 ppm. The molding material obtained has a greatly reduced thermal stability when a higher residual amount of catalyst is present.

The amine present in the catalyst complex is in general not removed from the reaction system when the catalyst metal component is separated off, and is present, in the above amount, in the organic solution of the polyphenylene ether which is employed in the novel process. The amine is evaporated together with the solvent in the multi-stage process according to the invention. Thus, an additional process step to separate off the amine component of the catalyst complex, for example an acid wash, is not required.

For the purposes of the invention, other polymers are homopolymers and copolymers of styrene and/or of its homologs, which preferably may be modified with rubber. The copolymers comprise in general acrylic acid methacrylic acid or their derivatives, such as acrylates, methacrylates, acrylamides, methacrylamides, acrylonitrile or methacrylonitrile, maleic anhydride or the esters of maleic acid, fumaric acid or itaconic acid. For the purposes of the invention, homologs of styrene are, in the narrowest sense, the products which are alkylated in the nucleus or in the side chain, in particular p-methylstyrene, m-methylstyrene and o-methylstyrene, and mixtures of these, α-methylstyrene, polyalkylated styrenes, eg. 2,4-dimethylstyrene, styrenes with higher alkyl substituents, eg. tert.-butylstyrene and vinyltetralin, and those containing aryl substituents, eg. phenylstyrene and vinylnaphthalene. However, other substituted styrenes may be regarded as homologs of styrene in the wider sense, for example styrenes which are halogenated, acylated or otherwise substituted in the nucleus. These homologs may also be employed as comonomers with styrene.

Modification to provide impact-resistance is carried out in a conventional manner using polybutadiene, styrene/butadiene rubber, polyisoprene, polyacrylates, ethylene/vinylacetate copolymers, polyisobutylene or EPDM.

The novel process uses a solution of the polyphenylene ether (PPE) in a suitable solvent. The solution is obtained, as a rule, in the process for the preparation of the PPE, and must, in this case, be freed of copper, manganese or other heavy metal catalysts of the oxidative coupling, in a manner which is not claimed here. However, it is not necessary to use a reaction solution which is free of heavy metal salt; it is also possible to dissolve solid PPE, or a mixture of this with a styrene polymer, in a solvent, to add a styrene polymer to the solution, and to work up the solutions together. Such a procedure may be useful when the preparation of the PPE and its compounding with styrene polymers take place a very long distance apart.

The apparatus comprises a cascade of successively arranged evaporation vessels:
1. Preconcentration
2. Further concentration
3. Evaporation under reduced pressure
4. Evaporation under greatly reduced pressure.

The novel process is carried out continuously in several stages. In a first stage, the starting solution is heated to 190°–250° C. in a heat exchanger, and its pressure is then let down, in the pre-concentration stage, to 0.5 to 2.5 bar, at 100° to 160° C. The solids content of the starting solution is thus increased from 10–20% to 15–60%. The concentrated solution is removed continuously, and the desired amount of styrene polymer is added to it continuously in a dynamic or static mixing unit. The styrene polymer may be introduced as a solution in the same solvent as the PPE or, preferably, as a melt. The solution or melt may contain non-volatile assistants, such as flame-proofing agents, stabilizers, mold-release agents, antistatics, etc., which may be introduced into the total compound under mild conditions in this manner.

If the solution of the polymer blend has a solids content of above 50% after the components have been combined, it may, in general, be subjected directly to the next stage but one, ie. evaporation under reduced pressure. Otherwise, it is subjected to further concentration (second stage) via a heat exchanger. In this stage, the temperature is increased from 100°–160° C. to 120°–200° C., and the solids content increases from 33–50% to 50–70% under a pressure of from 0.2 to 1.5 bar. The solution removed after further concentration is fed to stage 3, ie. evaporation under reduced pressure, via a further heat exchanger. For this purpose, the solution is heated to 220°–280° C., and the greater part of the residual solvent is stripped off under a pressure of from 10 to 50 mbar. Residues of below 2% are removed by subsequent evaporation under greatly reduced pressure (stage 4), at 220°–280° C. and under a pressure of from 1 to 5 mbar. The solution discharged from stage 3 may be heated further by means of a heat exchanger, and small amounts of evaporation assistants, eg. water or methanol, in liquid or vapor form, may additionally be metered in; as a rule, it is possible to dispense with both measures. The product is again removed continuously from stage 4, discharged as extrudates, cooled in a water bath and granulated. All percentages are by weight.

The volatile constituents from each stage are condensed separately and collected together; the collected condensates are fed via a common line to a distillation apparatus in which sparingly volatile impurities and, where relevant, the evaporation assistants are separated off. Any amines present are allowed to remain in the solvent, and recycled together with the latter.

By means of the novel process, it is possible to prepare polymer blends from polyphenylene ethers and styrene polymers, under mild conditions. The damage to the products, which occurs during the preparation of these polymer blends by the prior processes and is severe in some cases, is substantially reduced or completely suppressed. Accordingly, the resulting polymer blends possess high dimensional stability under heat, less intrinsic color and improved impact strength. This applies in particular to polymer blends based on polyphenylene ethers and styrene polymers which have been made impact-resistant. An additional advantage of the novel process is that soluble assistants, such as flameproofing agents, stabilizers and mold release agents or lubricants, may be readily incorporated in the polymer blends by adding them to the starting polymer solution, so that they pass through the multi-stage process of solvent evaporation. The additional step otherwise required to incorporate these assistants in order to preparare the polymer blend for processing can then be dispensed with.

The Example which follows illustrates the process according to the invention. To test the products, the following parameters were determined: the notched impact strength was measured at 23° C., according to DIN 53,453, using standard small bars injection molded at 280° C. The Vicat dimensional stability under heat (°C.) was determined in silicone oil, according to DIN 53,460, Process B.

The natural color of the resulting molding material was assessed visually with respect to freshly prepared aqueous iodine/potassium iodide solutions of different concentrations. The measurements are given as mg of iodine in 100 ml of aqueous potassium iodide solution, similarly to the method described in DIN 53,403. Percentages are by weight.

EXAMPLE

A solution of 10 parts of poly-(2,6-dimethylphenylene 1,4-oxide) (PPO, intrinsic viscosity $[\eta]=0.60$ dl/g, measured in chloroform at 25° C.) in 90 parts of ethylbenzene and 1 part of di-n-butylamine is discharged continuously from a tank at a rate of 50 kg/hour, via a tube-bundle heat exchanger where it is heated to 230° C., into a 250 l kettle, where it is let down to atmospheric pressure at 140° C. In this procedure, 25 kg/hour of volatile constituents are stripped off, and 5 kg of solids remain in 20.5 kg of volatile constituents (solids content: 19.6%). 15 kg/hour of impact-resistant polystyrene (HIPS) containing 8% of polybutadiene and having an intrinsic viscosity $[\eta]$ of the matrix of 0.65 dl/g (measured in toluene at 25° C.) are fed, as a melt at 220° C., to the solution in a static mixer (solids content: 49.4%). The solution warms up to 170° C., and is fed, without being heated further, into a vessel of 250 l capacity, where 5 kg/hour of volatile constituents distill off under 1 bar, at 140° C. The residual solution comprising 5 kg of PPO, 15 kg of impact-resistant polystyrene and 15.5 kg of volatile constituents (solids content: 56.3%) is discharged continuously, heated to 250° C. by means of a tube-bundle heat exchanger, and let down in a reduced-pressure chamber of 400 l capacity, which has been heated externally at 250° C. under a pressure of 30 mbar. The discharged melt contains 1.35% of volatile constituents. It is introduced, without being heated further, into a second reduced-pressure chamber of 100 l capacity, which has been heated externally to 250° C., where the final amounts of volatile substances are removed under a pressure of 1.5 mbar. The melt, which is discharged at a rate of 20 kg/hour, consists of a mixture of 75% of impact-resistant polystyrene and 25% of PPO, and contains from 150 to 300 ppm of residual ethylbenzene according to gas chromatography.

COMPARATIVE EXAMPLE

For comparison, the same mixture comprising 25% of PPO, obtained by precipitation from the starting solution using a 10-fold amount of methanol, and 75% of impact-resistant polystyrene is prepared for processing, at 310° C., using a ZDSK 53 from Werner & Pfleiderer. Both products were subjected to normal tests, and the results are given in the Table.

TABLE

| | Ratio PPO/ HIPS | Vicat dimensional stability under heat (°C.) | Notched impact strength $a_K$ [kJ/m$^2$] at 23° C. | mg of iodine in 100 ml of aqueous potassium iodide solution |
|---|---|---|---|---|
| Example | 25/75 | 115 | 13.7 | 60 |
| Comparative example (not according to the invention) | 25/25 | 113 | 8.8 | 130 |

We claim:

1. A process for the production of a molding material containing a high molecular weight polyphenylene ether from a solution of polyphenylene ether in an organic solvent, together with a homopolymer or copolymer of styrene, by freeing such solution from the solvent, said process comprising: heating a polyphenylene ether solution in a first stage to from 190° to 250° C. to concentrate the solution to a solids content of from 15 to 60% by weight, and thereafter, in a second stage, adding the styrene homopolymer or copolymer to the concentrated solution, whereupon the resulting solution of the polymer mixture is freed of the solvent by multistage evaporation under reduced pressure.

2. A process as claimed in claim 1, wherein the evaporation is carried out in the presence of water, methanol or a mixture thereof, which reduces the partial pressure.

3. A process as claimed in claim 1 wherein the styrene homopolymer or copolymer is added to the concentrated polyphenylene ether solution as a solution in the same solvent.

4. A process as claimed in claim 1, wherein the styrene homopolymer or copolymer is added to the concentrated polyphenylene ether solution in the form of a melt.

* * * * *